United States Patent [19]

Minami

[11] Patent Number: 4,809,043

[45] Date of Patent: Feb. 28, 1989

[54] DOCUMENT SCANNING OPTICAL DEVICE

[75] Inventor: Takehiro Minami, Sakai, Japan

[73] Assignee: Mita Industrial Co., Ltd., Osaka, Japan

[21] Appl. No.: 41,735

[22] Filed: Apr. 21, 1987

[30] Foreign Application Priority Data

Apr. 30, 1986 [JP] Japan ............................. 61-64130[U]

[51] Int. Cl.⁴ .............................................. G03B 27/54
[52] U.S. Cl. ......................................... 355/67; 355/71
[58] Field of Search ........................... 355/8, 67, 70, 71

[56] References Cited

U.S. PATENT DOCUMENTS

| 3,982,116 | 9/1976 | Sakuma | 355/67 X |
| 4,092,066 | 5/1978 | Kawai | 355/67 |
| 4,194,835 | 3/1980 | Shiode | 355/67 |
| 4,239,383 | 12/1980 | Peterson | 355/67 |
| 4,259,711 | 3/1981 | Mochizuki | 355/67 X |
| 4,295,186 | 10/1981 | Sugiura et al. | 355/67 X |
| 4,483,609 | 11/1984 | Harada | 355/67 X |
| 4,518,249 | 5/1985 | Murata et al. | 355/67 |

Primary Examiner—Fred L. Braun
Attorney, Agent, or Firm—Wenderoth, Lind & Ponack

[57] ABSTRACT

A document illuminating device, for use in an electrostatic copying machine or the like includes an illuminating lamp, a main reflecting device partly surrounding the illuminating lamp, and a subsidiary reflecting device disposed opposite to the illuminating lamp and the main reflecting device. The difference between a first quantity ($L_1$) of light illuminating a document via a first illuminating light path ranging from one side to the document without reflection by the subsidiary reflecting device and a second quantity ($L_2$) of light illuminating the document via a second illuminating light path ranging from the other side to the document with reflection by the subsidiary reflecting device is adjusted to not more than 15% of the sum of the first and second quantities ($L_1 + L_2$).

6 Claims, 2 Drawing Sheets

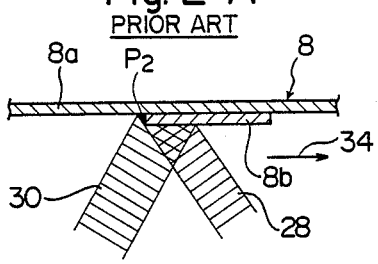
Fig. 2-A
PRIOR ART
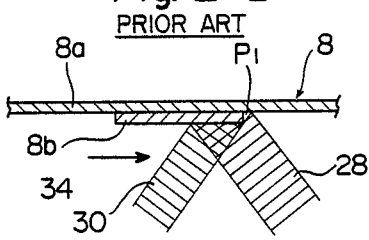
Fig. 2-B
PRIOR ART
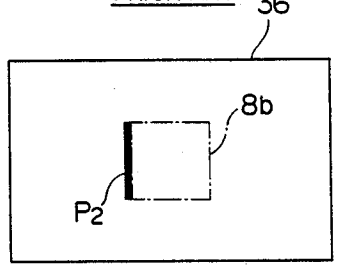
Fig. 3
PRIOR ART
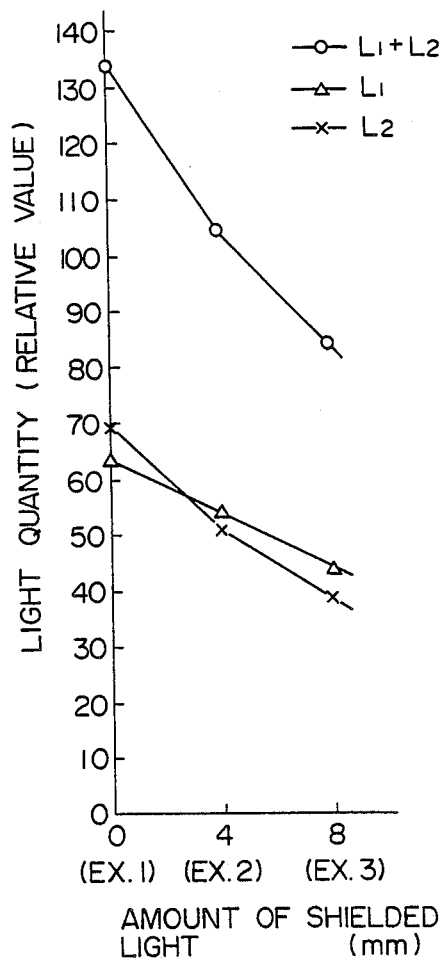
Fig. 5

DOCUMENT SCANNING OPTICAL DEVICE

FIELD OF THE INVENTION

This invention relates to a document scanning optical device for use in an image-forming machine, and particularly, to a document illuminating means therein.

DESCRIPTION OF THE PRIOR ART

It is well known that a document scanning optical device equipped with document illuminating means is used in image-forming machines such as an electrostatic copying machine. The most widely used type of document illuminating means in this optical device comprises an illuminating lamp, a main reflecting means partly surrounding the illuminating lamp and a subsidiary reflecting means disposed opposite to the illuminating lamp and the main reflecting means, and is adapted to illuminate a document via a first illuminating light path ranging from one side to the document without reflection by the subsidiary reflecting means and at the same time, to illuminate the document via a second illuminating light path ranging from the outer side to the document with reflection by the subsidiary reflecting means.

When the document is composed of a relatively large sheet and a relatively small sheet bonded thereto and there is a difference in surface level in the periphery of the small sheet owing to the thickness of the small sheet, an optical device having the aforesaid type of conventional document illuminating means has the disadvantage that a shadow of a specific part corresponding to the above difference in surface level in the document forms a shade in the resulting image.

The cause of this shade formation has been studied extensively, and it has been found that in the conventional document illuminating means, a first quantity of light illuminating the document via the first illuminating light path is much larger than a second quantity of light illuminating the document via the second illuminating light path (for example, the ratio of the first quantity of light to the second quantity of light is 7:3), and this great difference in the quantity of light gives rise to the aforesaid problem of shade formation.

The above problem might be solved by providing a second illuminating lamp and a second main reflecting means having substantially the same structures as the above illuminating lamp and main reflecting means and being positioned opposite to the above illuminating lamp and main reflecting means in place of the subsidiary reflecting means. This, however, greatly increases the cost of production. Moreover, there is a considerable difference in the rate of decrease of illuminance among illuminating lamps, which are for example halogen lamps, depending upon the time during which the lamps are used. It is difficult therefore to circumvent the above problem accurately.

SUMMARY OF THE INVENTION

It is a primary object of this invention to solve the aforesaid problem by improving a conventional document illuminating means of the aforesaid type without greatly increasing the cost of production.

According to this invention, the difference between the first quantity of light and the second quantity of light in the above-type of document illuminating means is adjustd to not more than 15 %, preferably not more than 7%, of the sum of the first quantity of light and the second quantity of light by, for example, using a subsidiary reflecting means having a higher reflectance than the main reflecting means.

Thus, the present invention provides a document scanning optical device comprising a document illuminating means having an illuminating lamp, a main reflecting means partly surrounding the illuminating lamp, and a subsidiary reflecting means disposed opposite to the illuminating lamp and the main reflecting means and being adapted to illuminate a document via a first illuminating light path ranging from one side to the document without reflection by the subsidiary reflecting means and at the same time, to illuminate the document via a second illuminating light path ranging from the other side to the document with reflection by the subsidiary reflecting means, wherein the difference between a first quantity ($L_1$) of light illuminating the document via the first illuminating light path and a second quantity ($L_2$) of light illuminating the document via the second illuminating light path is adjusted to not more than 15% of the sum of the first quantity ($L_1$) and the second quantity ($L_2$).

BRIEF DESCRIPTION OF THE DRAWINGS

FIGS. 2-A and 2-B are partial sectional views illustrating the problem of a conventional optical device;

FIG. 3 is a top plan view showing a copy obtained by using the conventional optical device;

FIG. 5 is a diagram showing the relative values of the total quantity of light, the first quantity of light and the second quantity of light in Examples 1 to 3.

DETAILED DESCRIPTION OF PREFERRED EMBODIMENTS

The invention will be described below in detail with reference to the accompanying drawings.

Figure 1:
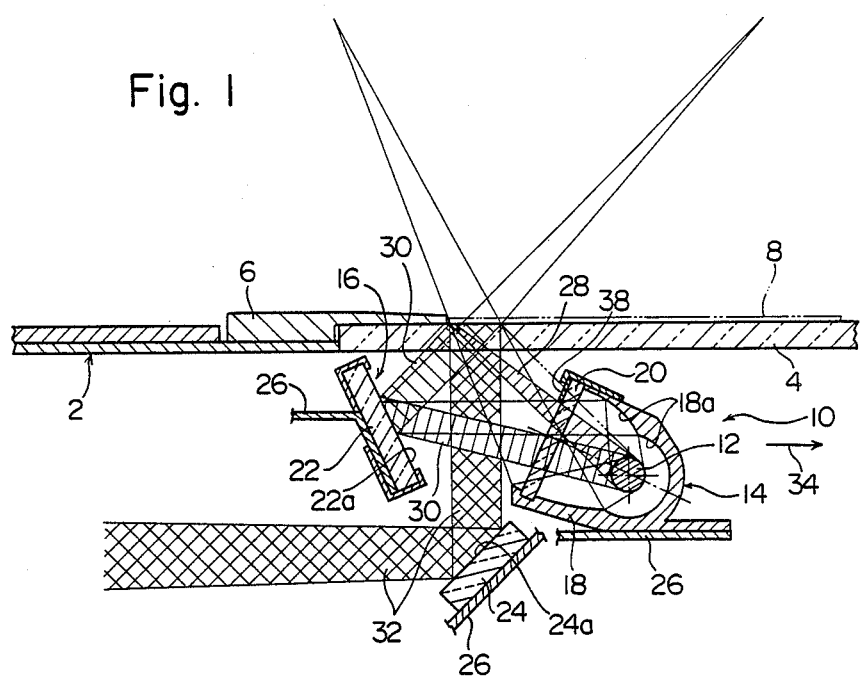
FIG. 1 is a partial sectional view showing one embodiment of the optical device in accordance with this invention.

FIG. 1 illustrates one embodiment of the optical device of the invention as applied to an electrostatic copying machine. The illustrated optical device includes a transparent plate 4 disposed on the upper surface of a housing 2 (part of which is shown in FIG. 1) of the electrostatic copying machine. Both ends of the transparent plate 4 are fixed in place via a fixing member 6 (only one end portion of the transparent plate 4 is shown in FIG. 1). A document 8 to be copied is placed on the transparent plate 4 as shown by a two-dot chain line.

The optical device also includes a document illuminating means shown generally at 10 and disposed below the transparent plate 4. The document illuminating means 10 comprises an illuminating lamp 12, a main reflecting means 14 and a subsidiary reflecting means 16. The illuminating lamp 12 may be made up of an elongate halogen lamp extending widthwise (in a direction perpendicular to the sheet surface in FIG. 1). The main reflecting means 14 may be composed of a reflecting member 18 which may be made of aluminum. The reflecting surface 18a of the reflecting member 18 is usually buffed and/or chemically polished, and has a reflectance of about 70%. The reflecting member 18 has a nearly U-shaped sectional shape and extends widthwise along the illuminating lamp 12. As shown in FIG. 1, the illuminating lamp 12 is positioned within the reflecting member 18 and the reflecting member 18, excepting an opening portion on one side surface thereof, surrounds the illuminating lamp 12. A known optical filter 20 selected according to the spectral sensitivity of an electrophotographic material (not shown) used in the electrostatic copying machine is disposed in the opening portion of the reflecting member 18. The subsidiary reflecting means 16 is made up of a flat reflecting member 22 extending in the widthwise direction. As shown in FIG. 1, the reflecting member 22 is disposed opposite to the illuminating lamp 12 and the main reflecting means 14. The optical device further includes a reflecting mirror 24 disposed between and beneath the main reflecting means 14 and the subsidiary reflecting means 16. In the illustrated embodiment, the illuminating lamp 12, the main reflecting means 14, the subsidiary reflecting means 16 and the reflecting mirror 24 are fixed to a common movable frame member 26 (only some portions of which are shown in FIG. 1).

When the illuminating lamp 12 is turned on in the optical device described above, the light from the lamp 12 illuminates the document 8 from one side via a first illuminating light path shown at 28 and at the same time, from the other side via a second illuminating light path shown at 30. More specifically, in the first illuminating light path 28, the light from the lamp 12 directly arrives at the document 8, and the light reflected by the reflecting surface 18a of the reflecting member 18 constituting the main reflecting means 14 arrives at the document 8. On the other hand, in the second illuminating light path 30, the light from the illuminating lamp 12 and the light reflected by the reflecting surface 18a of the reflecting member 18 reach the reflecting member 22 constituting the subsidiary reflecting means 16, then are reflected by the reflecting surface 22a of the reflecting member 22, and finally arrive at the document 8. The light reflected by the document reaches an electrophotographic material (not shown) via a projecting light path shown at 32. More specifically, the light reflected from the document 8 arrives at the reflecting mirror 24 and is reflected by the reflecting surface 24a of the reflecting mirror 24. Then, it arrives at the electrophotographic material (not shown) through a suitable optical element (not shown) such as a lens. The document 8 is scanned by moving the movable frame member 26, to which the illuminating lamp 12, the main reflecting means 14, the subsidiary reflecting means 16 and the reflecting mirror 24 are fixed, in a direction shown by an arrow 34 at a predetermined speed.

The structure and operation described above of the illustrated optical device are substantially the same as those of a conventional optical device. However, the conventional optical device has the following problem to be solved. In the conventional optical device, the reflecting member 22 constituting the subsidiary reflecting means 16 is formed of an ordinary aluminum plate without buffing and/or chemically polishing its reflecting surface 22a. The reflecting surface 22a has a reflectance of as low as about 30%. The second quantity ($L_2$) of light illuminating the document 8 via the second illuminating light path 30, therefore, is much smaller than the first quantity ($L_1$) of light illuminating the document 8 via the first illuminating light path 28, and for example, the ratio of the first quantity of light to the second quantity of light, $L_1:L_2$, is about 7:3. When the document 8 is, for example, a document composed of a relatively large sheet 8a and a relatively small sheet 8b bonded to the center of the sheet 8a as shown in FIGS. 2-A and 2-B, a shade occurs in the resulting copied image owing to a difference in surface level existing in the left edge of the bonded sheet 8b. When the right end portion of the bonded sheet 8b is to be illuminated, a first beam of light from the first illuminating light path 28 illuminates the right edge of the bonded sheet 8b from right bottom in FIG. 2-B, and a second beam of light from the second illuminating light path 30 illuminates the right edge of the bonded sheet 8b from left bottom in FIG. 2-B. It will be appreciated from FIG. 2-B that the second beam of light from the second light path 30 produces a shade in a region $P_1$ adjacent to the right edge of the bonded sheet 8b owing to a difference in surface level at the right edge of the sheet 8b. However, the first beam of light from the first light path 28 having a larger quantity than the second beam of light is projected onto the region $P_1$, and the shade in the region $P_1$ is caused to disappear. When the left end portion of the bonded sheet 8b is to be illuminated, the first beam of light from the first light path 28 illuminates the left end portion of the bonded sheet 8b from right bottom in FIG. 2-A and the second beam of light from the second light path 30 illuminates the left end portion of the bonded sheet 8b from left bottom in FIG. 2-A. In this case, it will be appreciated from FIG. 2-A that the first beam of light from the first light path 28 produces a shade in a region $P_2$ adjacent to the left edge of the bonded sheet 8b owing to the difference in surface level at the left edge of the bonded sheet 8b. The second beam of light from the second light path 30 is projected onto the region $P_2$, but since the quantity of the second beam of light is considerably smaller than the first beam of light, the shade in the region $P_2$ remains without complete disappearance. The remaining shade in the region $P_2$ is thus projectd onto the electrophotographic material, and as shown in FIG. 3, a copy 36 formed has shade corresponding to the left edge of the bonded sheet 8b.

In order to solve the problem of shade formation in the conventional optical device, the following improvements are made in the illustrated optical device of the invention.

Again, with reference to FIG. 1, the subsidiary reflecting means 16 is made of the reflecting member 22 having the reflecting surface 22a with a high reflectance. The reflectance of the reflecting surface 22a is larger than the reflectance (about 70%) of the reflecting surface 18a of the reflecting member 18 constituting the main reflecting means 14. Desirably, the reflecting surface 22a has a reflectance of at least 80%, preferably at least 85%. Conveniently, an ordinary mirror (reflectance about 88%), a known high reflecting mirror (reflectance about 93%), or the laminated reflecting plate (reflectance about 90%) disclosed in the specification of Japanese Laid-Open Patent Publication No. 162201/1985 can be used as the reflecting member 22. If the reflectance of subsidiary reflecting means 16 is increased, the second quantity ($L_2$) of light illuminating the document 8 via the second light path 30 necessarily increases to reduce the difference between the first quantity ($L_1$) of light illuminating the document 8 via the first light path 28 and the second quantity ($L_2$) of light illuminating the document 8 via the second light path 30.

Another improvement achieved is as follows. A light shielding member 38 is bonded entirely to the upper end portion of the optical filter 20 disposed in the opening portion of the reflecting member 18 constituting the main reflecting means 14 in the widthwise direction (in a direction perpendicular to the sheet surface in FIG. 1). The light shielding member 38 may be made of a light-shielding material such as an aluminum foil. As will be clearly seen from Examples given hereinbelow, when the opening portion (particularly its upper end portion) of the reflecting member 18 is shielded from light by using the light shielding member 38, both the first quantity ($L_1$) of light illuminating the document 8 via the first light path 28 and the second quantity ($L_2$) of light illuminating the document 8 via the second light path 30 are reduced. The rate of reduction of the first quantity ($L_1$) is much higher than that of the second quantity ($L_2$), and the difference between the first quantity ($L_1$) and the second quantity ($L_2$) is considerably decreased.

Experimental work of the present inventor has shown that if the difference between the first light quantity ($L_1$) and the second light quantity ($L_2$) is adjusted to not more than 15 %, preferably not more than 7%, of the total light quantity ($L_1 + L_2$), the occurrence of a shade in an image owing to the difference in surface level in the document 8 can generally be inhibited or circumvented fully, although the above difference may vary depending upon the magnitude of the difference in surface level in the document 8 and the total light quantity (the sum of the first light quantity $L_1$ and the second light quantity $L_2$).

The difference between the first light quantity ($L_1$) and the second light quantity ($L_2$) can also be considerably decreased if instead of bonding the light shielding member 38 to the upper end portion of the optical filter 20, the reflecting member 18 constituting the main reflecting means 14 itself is slightly turned counterclockwise in FIG. 1 to direct its opening portion slightly downwardly.

Figure 4:
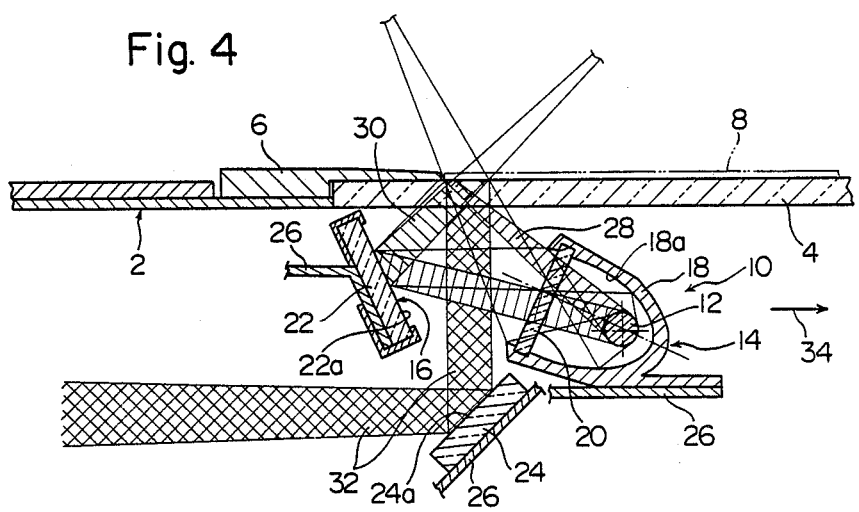
FIG. 4 is a partial sectional view showing another embodiment of the optical device in accordance with this invention.

In another embodiment of the optical device improved in accordance with this invention as shown in FIG. 4, the cross-sectional shape of the reflecting member 18 constituting the main reflecting means 14 is changed instead of bonding the light shielding member to the upper end portion of the optical filter. Specifically, the upper wall portion of the reflecting member 18 is slightly lowered to decrease the height of the opening portion of the reflecting member 18 by an amount corresponding to the light shielding height of the light shielding member. This structure also enables the difference between the first light quantity ($L_1$) and the second light quantity ($L_2$) to be considerably decreased substantially as in the case of using the light shielding member. Other structural features of the embodiment shown in FIG. 4 are the same as in the embodiment shown in FIG. 1.

In the above embodiments, some elements of the optical device are moved at the time of scanning the document, but it should be understood that the present invention is also applicable to an embodiment in which at the time of scanning the document, the document itself is moved while the optical device remains stationary.

Comparative Example

An electrostatic copying apparatus (Model 313Z) manufactured and sold by Mita Industrial Co., Ltd. was used.

The document illuminating means of the optical device used in this copying apparatus was of the type shown in FIG. 1 except that (a) the reflecting member constituting the subsidiary reflecting means is formed of an ordinary aluminum plate, and (b) no light shielding member is provided.

The document illuminating means had the following characteristics:

(1) The illuminating lamp was a 460W halogen lamp, (2) The reflecting surface of the reflecting member constituting the main reflecting means had a reflectance of about 70%, (3) The reflecting surface of the reflecting member constituting the subsidiary reflecting means had a reflectance of about 30%, and (4) The height of the opening portion of the reflecting member constituting the main reflecting means was 20 mm.

In the above document illuminating means, the first quantity ($L_1$) of light illuminating the document via the first light path and the second quantity ($L_2$) of light illuminating the document via the second illuminating light path were measured as follows.

The illuminating lamp was first turned on, and the illuminance of the upper surface of the transparent plate was measured by an illuminator (Model T-1M sold by Minolta Camera Co., Ltd.). This measured value was taken as the total light quantity (the sum of the first light quantity $L_1$ and the second light quantity $L_2$). Then, the reflecting surface of the reflecting member constituting the subsidiary reflecting means was covered with a black cloth, and the illuminance of the upper surface of the transparent plate was measured in the same way. The measured value was taken as the first light quantity ($L_1$). The second light quantity ($L_2$) was calculated by subtracting the first light quantity ($L_1$) from the total light quantity ($L_1 + L_2$).

Thus, if the total light quantity ($L_1 + L_2$) is taken as 100, the relative value of the first light quantity ($L_1$) is about 70, and the relative value of the second light quantity ($L_2$) is about 30. The ratio of the first light quantity ($L_1$) to the second light quantity ($L_2$) ($L_1:L_2$) is about 7:3.

An ordinary copying paper sheet having a size of A4 according to JIS with a white thick paper sheet having a size of $10 \times 10$ cm and a thickness of 0.2 mm bonded centrally to the surface of the copying paper sheet was placed on the transparent plate as the document, and copied in a customary manner. A shade clearly perceptible to the eye occured in the copy corresponding to the left edge of the thick paper as shown in FIG. 3.

Examples 1 to 3

The following improvements were made in the document illuminating means of the optical device in the electrostatic copying machine used in the Comparative Example.

The reflecting member constituting the subsidiary reflecting means was replaced by a laminated reflecting plate of the type disclosed in the above-cited Japanese Laid-Open Patent Publication No. 162201/1985 and having a reflectance of about 90% at its reflecting surface (Example 1).

In addition to this improvement, in Examples 2 and 3, a light shielding member composed of an aluminum foil was bonded to the optical filter disposed at the opening portion of the reflecting member constituting the main reflecting means 14 to shield the opening portion from light entirely in its widthwise direction (in a direction perpendicular to the sheet surface in FIG. 1) to an extent of 4 mm (Example 2) and 8 mm (Example 3) from its upper end.

As in the Comparative Example, the total light quantity ($L_1+L_2$), the first light quantity ($L_1$) and the second light quantity ($L_2$) were determined. The relative values of these quantities are shown in FIG. 5 by taking the total light quantity ($L_1+L_2$) in the Comparative Example as 100. The difference between the first light quantity ($L_1$) and the second light quantity ($L_2$) was about 5% (Example 1), about 3% (Example 2) and about 7% (Example 3) based on the total light quantity ($L_1+L_2$).

In each of Examples 1 to 3, a copy was produced by using the same document as used in the Comparative Example. The occurrence of a shade corresponding to the left edge of the document was not observed in any of Examples 1 to 3. On the other hand, when an ordinary document having printed characters was copied, a good copy could be obtained in Example 2. But in Example 1, the density of the copied image was low because of the excessively large total light quantity ($L_1+L_2$). In Example 3, the copied image was dark as a whole because of the excessively small total light quantity ($L_1+L_2$).

What is claimed is:

1. In a document scanning optical device comprising a document illuminating means having an illuminating lamp, a main reflecting means partly surrounding the illuminating lamp, and a subsidiary reflecting means disposed opposite to the illuminating lamp and the main reflecting means, said document illuminating means illuminating a document via a first illuminating light path extending in a first direction to the document without reflection by said subsidiary reflecting means and at the same time illuminating the document via a second illuminating light path extending in a second direction to the document after reflection by said subsidiary reflecting means, the improvement comprising:

means for adjusting the difference between a first quantity ($L_1$) of light illuminating the document via said first illuminating light path and a second quantity ($L_2$) of light illuminating the document via said second illuminating light path to be not more than 15% of the sum of the first quantity ($L_1$) and the second quantity ($L_2$), said adjusting means comprising said subsidiary reflecting means having a larger reflectance than said main reflecting means.

2. The improvement claimed in claim 1, wherein said adjusting means adjusts said difference between the first light quantity ($L_1$) and the second light quantity ($L_2$) to be not more than 7% of the sum of the first light quantity ($L_1$) and the second light quantity ($L_2$).

3. The improvement claimed in claim 1, wherein the first light quantity ($L_1$) and the second light quantity ($L_2$) are substantially equal to each other.

4. The improvement claimed in claim 1, wherein the reflectance of said main reflecting means is not more than 75%, and said reflectance of said subsidiary reflecting means is at least 80%.

5. The improvement claimed in claim 4, wherein said reflectance of said subsidiary reflecting means is at least 85%.

6. The improvement claimed in claim 1, wherein said adjusting means further comprises a light shielding member restricting the amount of light leaving said main reflecting means.

* * * * *